United States Patent [19]

Alm et al.

[11] Patent Number: 4,497,328
[45] Date of Patent: Feb. 5, 1985

[54] COMBINE CONCAVE

[76] Inventors: Arthur L. Alm, Rte. #1, Box 12; Murry W. Schuler, Rte. #2, Box 66, both of Griswold, Iowa 51535

[21] Appl. No.: 532,373

[22] Filed: Sep. 15, 1983

[51] Int. Cl.³ .................................. A01D 12/24
[52] U.S. Cl. ............................ 130/27 K; 130/27 P
[58] Field of Search ................ 130/27 P, 27 K, 27 J

[56] References Cited

U.S. PATENT DOCUMENTS

| 577,608 | 2/1897 | Rogers | 130/27 R |
| 870,781 | 11/1907 | Landis | 130/27 K |
| 993,193 | 5/1911 | Pelican | 130/27 K |
| 1,342,806 | 6/1920 | Gross | 130/27 K |
| 2,457,259 | 12/1948 | Moll | 130/27 K |
| 3,537,459 | 11/1970 | Thomas | 130/27 K |

FOREIGN PATENT DOCUMENTS

| 223418 | 9/1962 | Austria | 130/27 J |
| 219065 | 3/1942 | Switzerland | 130/27 P |
| 641914 | 1/1979 | U.S.S.R. | 130/27 K |

*Primary Examiner*—Jay N. Eskovitz
*Attorney, Agent, or Firm*—Zarley, McKee, Thomte, Voorhees & Sease

[57] ABSTRACT

An improved concave for use on a combine has a plurality of spaced-apart bars mounted parallel to the axis of rotation of the combine cylinder and at an angle with respect to a radial line passing from the center of the cylinder through each of the bars. The angle of inclination of the bars increases progressively from the intake end to the discharge end of the concave. The passageway between the concave and the cylinder also becomes progressively smaller from the intake to the discharge end of the concave. The angle of inclination of the bars aids the passage of grain between the bars and reduces resistance of the bars to the passage of grain therebetween.

3 Claims, 3 Drawing Figures

COMBINE CONCAVE

BACKGROUND OF THE INVENTION

Combines having concaves for threshing of grain are common in the farming industry. Conventional concaves include a plurality of spaced-apart bars which are mounted such that in cross section they are aligned with respect to a radial line passing from the center of the combine cylinder through each of the bars. Such a construction of the concave often results in a problem that the grain separated from the stalks often is carried beyond the concave to be discharged with the stalks rather than falling through the concave to be separated from the stalks. The conventional concave is thus inefficient in that it fails to collect all of the grain separated from the stalks.

Therefore, a primary objective of the present invention is an improved combine concave for facilitating the movement of grain between the concave bars.

A further objective of the present invention is the provision of an improved combine concave in which the resistence of the concave bars to the passage of grain therebetween is minimized.

A further objective of the present invention is the provision of a combine concave which is economical to manufacture and durable in use.

SUMMARY OF THE INVENTION

The improved concave of the present invention includes a plurality of elongated bars mounted along their length parallel to the axis of rotation of the combine cylinder. The bars are also disposed at an angle with respect to a radial line passing from the center of the cylinder through each of the bars so as to aid the movement of grain between the bars and so as to minimize the resistance of the bar to the passage of grain therebetween. The angle of inclination of the bars increases progressively from the intake end of the concave to the discharge end thereof. Also, the radial distance between the concave bars and the cylinder becomes progressively smaller from the intake to the discharge end of the concave.

DETAILED DESCRIPTION OF THE DRAWINGS

Figure 1:
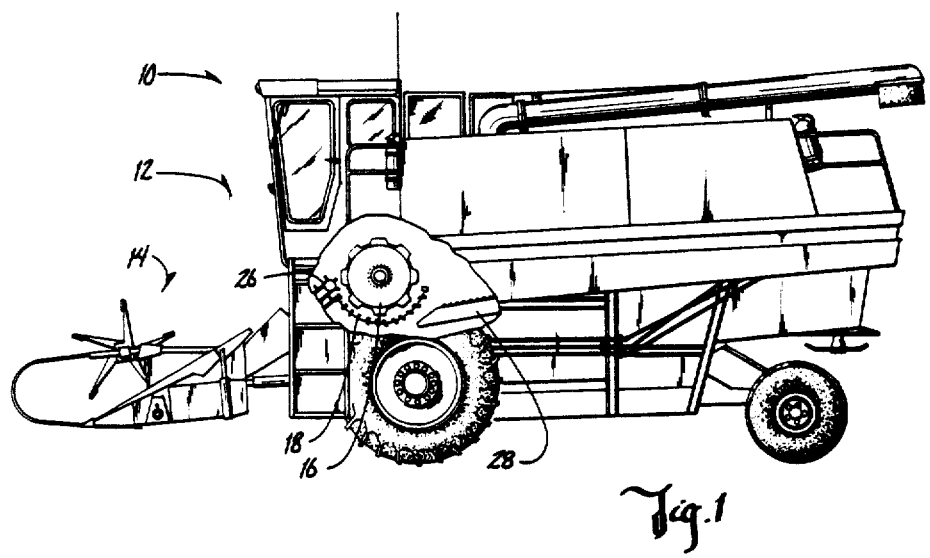
FIG. 1 is a side elevational view of a combine with a portion of the side wall of the combine removed so as to show the combine cylinder and concave.

The numeral 10 generally designates a combine commonly used in farming operations for threshing of grain. Combine 10 generally includes a main body portion 12, a header 14, a cylinder 16, and a concave 18. Cylinder 16 is mounted on a shaft 17 for rotation therewith.

Concave 18 is mounted adjacent the lower peripheral edge of cylinder 16 so as to define a passageway 20 therebetween. Concave 18 has an intake end 22 and a discharge end 24. Concave 22 is positioned with respect to cylinder 16 such that passageway 20 between cylinder 16 and concave 18 becomes progressively smaller from intake end 22 to discharge end 24 of concave 18.

Concave 18 includes a plurality of spaced-apart bars 30 mounted on a plurality of supporting members 32. Supporting members 32 extend through aligned holes in bars 30. Glue or other appropriate means are employed to maintain bars 30 in a fixed rigid position on members 32. Most of the bars 30 are disposed at an angle with respect to a radial line passing from the center of the cylinder through each of the bars. This angle of inclination of bars 30 increases progressively from intake end 22 to discharge end 24 of concave 18, as best seen in FIG. 2.

Figure 2:
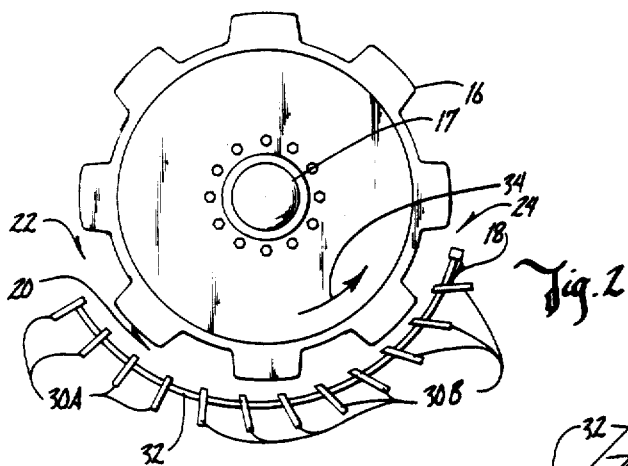
FIG. 2 is a side elevational view of the combine cylinder and concave.
Figure 3:
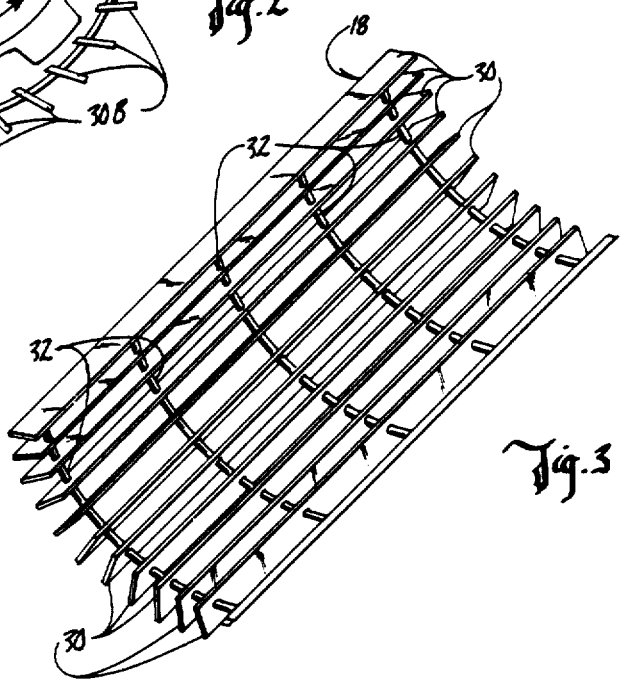
FIG. 3 is a perspective view of the combine concave.

The first several bars, designated 30A in FIG. 2, are disposed in radial alignment with respect to the cylinder 17. The subsequent bars 30B are disposed at progressively greater angles with respect to bars 30A so that the bars 30B are inclined towards the discharge end 24 at their outer edges. The inner edges of bars 30B are beveled rather than being square to generally present a surface parallel to the perimeter of the cylinder 16.

Most of the threshing of the grain is caused by bars 30A. Because of the inclination of bars 30B, it is more difficult for a grain kernal adjacent the inner ends of the bars to be swept over the inner edge of the bars than with bars 30A. This is best seen by visualizing the ease by which grain could move over the inner edges of the bars if their angle of inclination was reversed. The inclined bars 30B simply provide more resistance to the grain moving on a continued path through passageway 20, and they provide less resistance to the movement of the grain downwardly between the bars. The kernals of grain are subjected to centrifugal force, and it is seen that grain striking the intake sides of bars 30B would never be likely to deflect upwardly into passageway 20.

In operation, the stalk with its grain is cut by header 14 as combine 10 moves through the field. The stalk and grain material is transported by conveyor 26 to intake end 22 of concave 18. Cylinder 16 is rotated as indicated by arrow 34 so as to pull the stalk and grain through concave 18. As the grain contacts bars 30 of concave 18 it is separated from the stalk and falls through the spaces between bars 30 into a collection container (not shown). As the stalk and some of the grain progresses towards discharge end 24 of concave 18, it is further threshed. As explained above, the angle of inclination of bars 30 towards discharge end 24 of concave 18 facilitates the passage of the grain between the bars and also reduces the resistance of the bars to the passage of the grain therebetween. The bare stalks exit from discharge end 24 of concave 18 and are carried away by conveyor 28 adjacent discharge end 24.

Thus, it can be seen that at least all of the stated objectives are accomplished by the concave of the present invention.

What is claimed is:

1. In combination, a combine cylinder having an axis of rotation, and a concave closely spaced with respect to said cylinder, said concave having an intake end and a discharge end, said concave comprising, a plurality of elongated, generally arcuately shaped parallel support members, a plurality of elongated bars mounted on said support members such that the longitudinal axes of said bars are generally perpendicular to said support members and parallel to the axis of rotation of said cylinder, said bars being permanently rigidly fixed to said support members and being generally rectangular in cross section including relatively narrow inner and outer edges with the inner edge positioned adjacent a portion of said cylinder, and relatively wider oppositely facing side edges extending generally away from said inner edge and said cylinder, said bars, adjacent at least the discharge end of said concave, having the outer edges thereof circumferentially offset relative to the inner edges thereof in a direction toward the discharge end of the concave so that the side edges thereof are disposed at an angle with respect to a radial line passing from the center of said cylinder through the longitudinal axis of the respective bars to facilitate the movement of grain between the bars and to minimize the resistance of said bars to the passage of grain therebetween, and said inner edges of said bars projecting an equal distance inwardly from said support members toward said cylinder.

2. The combination of claim 1 wherein the radial distance between said concave and said cylinder becomes progressively smaller from the intake to the discharge end of said concave.

3. The combination of claim 1 wherein said angles of said side edges increase progressively from the intake to the discharge end of said concave.

* * * * *